[redacted]

Examiner

G. W. J. Tose
Mouz

BEST AVAILABLE COPY

No. 140
14036

Patented April 8 1856

[redacted]

BEST AVAILABLE COPY

UNITED STATES PATENT OFFICE.

GEO. W. N. YOST, OF PITTSBURG, PENNSYLVANIA.

IMPROVEMENT IN GRAIN-BINDERS FOR HARVESTERS.

Specification forming part of Additional Improvement No. 140, dated April 8, 1856, to Letters Patent No. 14,036, dated January 1, 1856.

*To all whom it may concern:*

Be it known that I, GEORGE W. N. YOST, of Pittsburg, in the county of Allegheny and State of Pennsylvania, have invented certain additional improvements on the harvester patented by me January 1, 1856; and I do hereby declare that the following is a full, clear, and exact description of the principle or character which distinguishes it from all other things before known, and of the usual manner of making, modifying, and using the same, reference being had to the accompanying drawings, of which—

Figure 1 represents a plan of the harvester; Fig. 2, a side elevation, showing the form of cams, &c.; Fig. 3, a perspective view of the compressor $a^2$ and slide-plate $q$, and showing the slat $r$ and manner of adjustment; Fig. 4, a detached part of the plate-lever and spring, showing more clearly their connection with each other.

My invention consists in certain improvements in the harvester for which I obtained Letters Patent January 1, 1856, by which I am enabled to operate the reciprocating compressor $a^2$ with the required intervals at each point where the bundle is compressed the most, and to retain it at this point a given length of time to enable the binder to complete the operation of tying and discharging the sheaves; also, for adjusting the compressors forward or backward on the platform for the purpose of always having them to compress the bundle near the center, whether long or short grain is cut; also, for preventing the cut grain from falling in the way of the binder while in the act of binding the compressed bundle, which I describe as follows:

On the face of the driving-wheel $a$, I secure a continuous combination of cams, formed by two circular rims, $b$ $b'$. These cams are formed by a continuous slot left between the rims $b$ $b'$, and of the shape shown in Fig. 2. On one end of the frame $c$, which supports the driving-wheel, and pivoted thereto, is a small lever, $d$. The pivot $d'$ serves as the fulcrum of this lever, one end of which takes into the continuous slot $e$, and is operated upon by the peculiar form of this slot. The other end of this lever is secured between a small flanged wheel, $f$, keyed to the pinion-shaft $g$. This shaft has its bearings on two arms, $h$ $h$, projecting from the frame $c$, and is covered by caps $h'$ $h'$. This shaft has also secured to it, between the arms $h$ $h$ two bevel-pinion spur-wheels, $i$ $i$, which take alternately into the bevel-wheel $j$, secured to the end of shaft $j'$ of the driving-wheel.

On one end of the pinion-shaft $g$, and attached thereto, vibrates the band-wheel $k$ for operating the reciprocating compressor $a^2$. On the outer rim, $b$, of the driving-wheel are placed projecting pieces $b^2$ $b^3$. These pieces are for the purpose of operating the long bent lever $m$, and placed against this rim so as to operate said lever at every half-revolution of the driving-wheel. This lever $m$ is pivoted to the platform $n$ at the point $m'$ and about midway between the stationary compressors $a'$ $a'$. A pin, $o$, projecting from this lever, is for the purpose of retaining a spring, $p$, which forces the armature $m^2$ outward and against the rim $b$. This lever has at either end notches cut in it for the purpose of receiving the projecting pins $p'$ $p^2$. These pins are secured in the slide-plate $q$ and on each side of a slot, $r'$, cut in said plate, for the purpose of adjusting the compressor $a^2$, part of which extends through the slot $r$, and is secured to the bottom of the plate by a nut, $s$, as seen in Fig. 4.

Secured in front of the platform $n$ are two bent guards, $t$ $t$, for the purpose of preventing the cut grain from falling in the upper part of the compressors while the operation of tying is performed.

Having thus described the different parts of my invention and their connection with each other, I will proceed to describe their operation, as follows:

We will start the machine. The projection $b^3$ on the outer rim of the driving-wheel being ready to operate the lever $m$, the small lever $d$ has just thrown the pinion-wheel $i'$ into gear with whel $j$, (this operation is not shown in the drawings,) the band-wheel $k$ made one revolution and carried the compressor $a^2$ to the farthest end of the platform, as described in my Letters Patent of January 1, 1856, and, it being there secured by the notch in the lever $m$, the binder ties the bundle. While the operation of binding is going on and the machine moving forward, the arm of the small lever $d$ being in one of the cams, which throws both pinions $i$ $i'$ out of gear with the wheel $j$, and allows the band-wheel $k$, and consequently the compressor $a^2$, to [illegible] stationary [illegible] stage the small lever arrives at the point [illegible] lever $m$ is operated by projection $b^3$, throws pinion $i$ into gear with wheel $j$, reverses the direction of the band-wheel, and draws the compressor $a^2$ toward the opposite end of the platform. The grain having fallen during the period of binding between the stationary compressor $a'$ and the reciprocating compressor $a^2$, it rakes and compresses the grain into a bundle, ready for the other binder to tie. The notch catches onto the pin $p^2$, and is held there until the wheel $a$ has made another quarter-revolution, when the projection $b^2$ operates the lever $m$ and relieves the compressor, which, by this time, is ready to return, and vice versa.

By these means I produce the same results in a more perfect and practicable manner than by the arrangement of operation described in my former patent, as aforesaid.

[illegible] desire [illegible] Patent [illegible] an [illegible] harvesters, for which Letters Patent were granted to me on the 1st of January, 1856, [illegible]

1. The long lever $m$, operated by projections $b^3$ $b^3$, and spring $p$, for the purposes hereinabove set forth.

2. The arrangement and combination, with the cams for operating the compressor, of the lever $d$, bevel-gearing $j$ $i$ $i'$, and pulley-wheel $e$ on the pinion-shaft, all arranged and operating for the purposes hereinabove set forth.

3. The guards $t$ $t$, for the purposes substantially as herein set forth.

G. W. N. YOST.

Witnesses:
R. T. CAMPBELL,
JOHN S. HOLLINGSHEAD.

BEST AVAILABLE COPY